(12) United States Patent
Smith et al.

(10) Patent No.: US 10,386,589 B2
(45) Date of Patent: Aug. 20, 2019

(54) HYBRID CABLE-TO-BOARD CONNECTOR

(71) Applicant: 3M INNOVATIVE PROPERTIES COMPANY, St. Paul, MN (US)

(72) Inventors: Terry L. Smith, Roseville, MN (US); Saujit Bandhu, Singapore (SG); YunLong Qiao, Singapore (SG); Chin Hua Lim, Singapore (SG); Barry J. Koch, Florence, TX (US)

(73) Assignee: 3M Innovation Properties Company, St. Paul, MN (US)

( * ) Notice: Subject to any disclaimer, the term of this patent is extended or adjusted under 35 U.S.C. 154(b) by 0 days.

(21) Appl. No.: 15/881,827

(22) Filed: Jan. 29, 2018

(65) Prior Publication Data

US 2018/0217341 A1     Aug. 2, 2018

Related U.S. Application Data

(60) Provisional application No. 62/453,261, filed on Feb. 1, 2017.

(51) Int. Cl.
*G02B 6/42* (2006.01)
*H01R 12/71* (2011.01)
(Continued)

(52) U.S. Cl.
CPC .......... *G02B 6/426* (2013.01); *G02B 6/3897* (2013.01); *G02B 6/428* (2013.01); *G02B 6/4277* (2013.01); *G02B 6/4284* (2013.01); *G02B 6/4292* (2013.01); *G02B 6/43* (2013.01); *H01R 12/716* (2013.01); *H01R 13/26* (2013.01); *H01R 13/405* (2013.01); *H01R 24/64* (2013.01);
(Continued)

(58) Field of Classification Search
None
See application file for complete search history.

(56) References Cited

U.S. PATENT DOCUMENTS

| | | |
|---|---|---|
| 5,224,866 A | 7/1993 | Nakamura et al. |
| 5,546,281 A | 8/1996 | Poplawski |

(Continued)

FOREIGN PATENT DOCUMENTS

| | | |
|---|---|---|
| JP | 2007-028872 | 2/2007 |
| JP | 2011-147215 | 7/2011 |

(Continued)

*Primary Examiner* — Omar R Rojas
(74) *Attorney, Agent, or Firm* — Robert S. Moshrefzadeh

(57) ABSTRACT

The present invention relates to a hybrid connector. The connector comprises an insulating housing having parallel rows of first and second terminals disposed in the housing. Each first and second terminal includes a terminal portion configured to make contact with an electrically conductive trace of a circuit board; and a mating portion configured to contact a terminal of a mating connector, the mating portions of the first terminals parallel to and facing the mating portions of the second terminals. The housing defines a cavity formed therein between the mating portions of the first and second terminals, wherein the cavity defining a cavity opening at an external surface of the housing for receiving light therefrom. An optical relay portion is disposed in the cavity, wherein the optical relay portion comprises at least one of an optical transceiver, an optical lens and an optical waveguide.

19 Claims, 9 Drawing Sheets

(51) Int. Cl.
*H01R 13/26* (2006.01)
*G02B 6/38* (2006.01)
*H01R 12/57* (2011.01)
*H01R 107/00* (2006.01)
*H01R 13/405* (2006.01)
*H01R 24/64* (2011.01)
*G02B 6/43* (2006.01)

(52) U.S. Cl.
CPC ............ *G02B 6/423* (2013.01); *G02B 6/4214* (2013.01); *G02B 6/4283* (2013.01); *H01R 12/57* (2013.01); *H01R 2107/00* (2013.01)

(56) References Cited

U.S. PATENT DOCUMENTS

| | | | |
|---|---|---|---|
| 6,213,651 B1 | 4/2001 | Jiang | |
| 6,558,191 B2 | 5/2003 | Bright | |
| 7,147,512 B2 | 12/2006 | Wu | |
| 7,354,205 B2 | 4/2008 | Sakata | |
| 7,896,689 B1 | 3/2011 | Su | |
| 9,453,976 B2 | 9/2016 | Qian | |
| 9,465,170 B1 | 10/2016 | Childers | |
| 9,880,367 B2 * | 1/2018 | Faw | H01R 12/716 |
| 2002/0025720 A1 | 2/2002 | Bright | |
| 2002/0076173 A1 | 6/2002 | Jiang | |
| 2004/0218873 A1 | 11/2004 | Nagashima et al. | |
| 2006/0234556 A1 | 10/2006 | Wu | |
| 2007/0280603 A1 | 12/2007 | Sakata | |
| 2011/0045702 A1 | 2/2011 | Su | |
| 2011/0116756 A1 | 5/2011 | Vastmans | |
| 2011/0255830 A1 | 10/2011 | Phillips | |
| 2012/0063718 A1 | 3/2012 | Steijer | |
| 2012/0261185 A1 | 10/2012 | Murao | |
| 2013/0005192 A1 | 1/2013 | Lim | |
| 2014/0335727 A1 | 11/2014 | Lim | |
| 2015/0311612 A1 * | 10/2015 | Qiao | H01R 12/716 439/607.01 |
| 2016/0209610 A1 | 7/2016 | Kurtz | |
| 2016/0231521 A1 | 8/2016 | Smith | |
| 2018/0072924 A1 | 3/2018 | Thompson | |

FOREIGN PATENT DOCUMENTS

| | | |
|---|---|---|
| JP | 2011-151962 | 8/2011 |
| JP | 2012-038567 | 2/2012 |
| JP | 2012-085439 | 4/2012 |
| WO | WO 2013-012680 | 1/2013 |
| WO | WO 2014-099405 | 6/2014 |
| WO | WO 2015-038941 | 3/2015 |
| WO | WO 2015-094811 | 6/2015 |

* cited by examiner

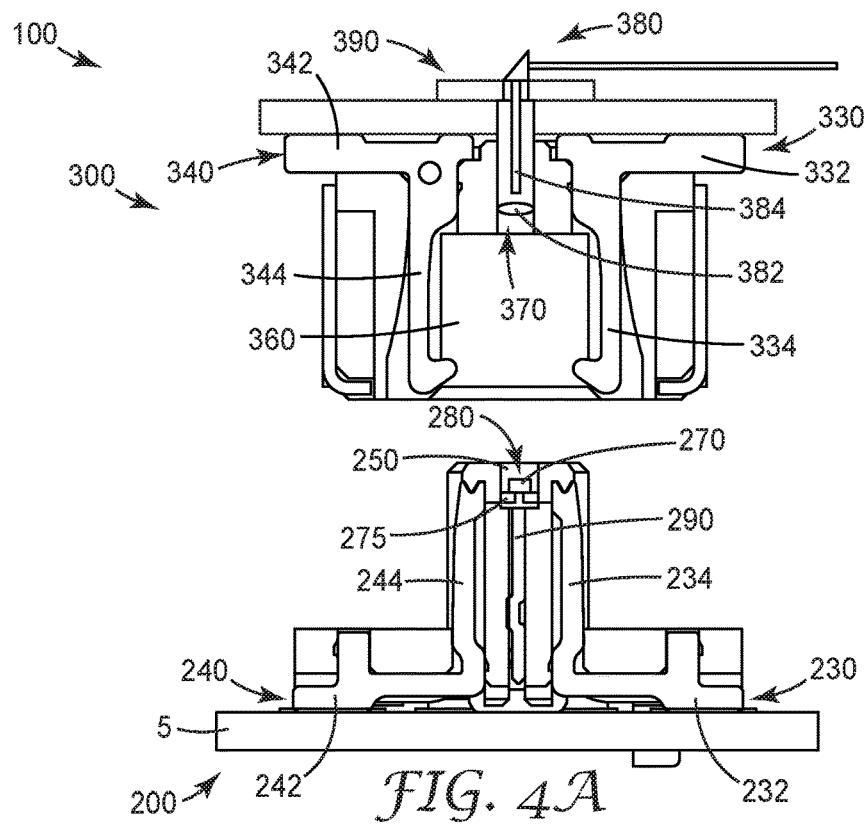
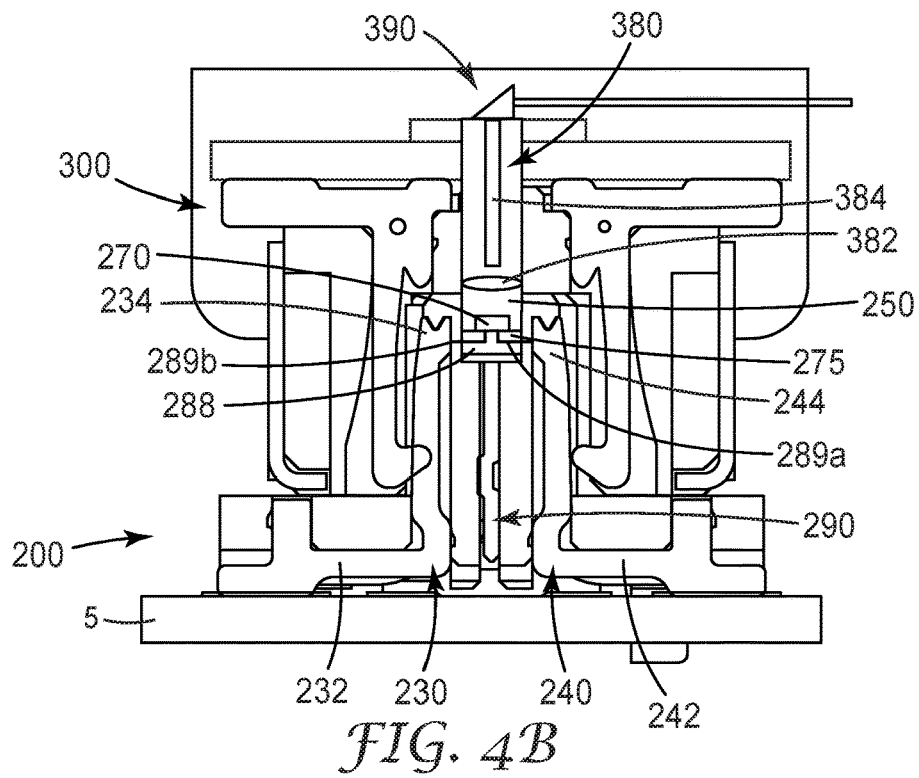

HYBRID CABLE-TO-BOARD CONNECTOR

BACKGROUND OF THE INVENTION

Field of the Invention

The present invention relates to a hybrid cable-to-board connectors, and more particularly to a fine-pitch, high-speed hybrid cable-to-board connection system for mid-plane applications.

Background

In conventional electronic equipment such as portable communications devices and laptops, board-to-board connections are typically made with low-profile board-to-board electrical connectors that enable circuitry on different circuit boards to be placed in close proximity. However, electrical connectors may not be able to handle the amount of data needing to be transferred as data rates continue to increase.

Transmission of a large number of high-speed (>10 Gbps) digital signals from boardmount modules to the mid-plane or back-plane can be challenging. The higher the signal frequency, the greater are the losses incurred by the signals traveling through copper traces on a printed circuit board (PCB). In addition, routing large number of high-speed digital signals via electrical connectors can pose significant challenges in managing cross talk between adjacent differential signal channels.

In conventional wire-to-board connector assemblies used in low-speed transmission environments, where cross talk (both near end and far end) and electromagnetic interference (EMI) are not very critical, shielding or grounding the contacts for improving the cross talk and EMI is not generally needed.

However, with the exponential increase in the transmission data rates over last 5 years, cable-to-board connectors are needed that show superior performance over GHz range of frequencies. One approach being considered to address this need is to route optical fiber directly to the mid-board since optical signals are not subject to loss and crosstalk to the same degree as copper wires. However, existing optical fiber connectors are poorly adapted to this application, due to their large size and lack of accompanying copper conductors for power or lower speed electrical signal transmission. Hence, there is an increasing need to connect optical fiber transmission media to circuit boards in electronic equipment to handle data transmission rates in the future.

SUMMARY

The present invention relates to cable-to-board connectors, and more particularly to a fine-pitch high-speed hybrid cable-to-board connector assemblies for mid-board connections.

The present invention relates to hybrid cable-to-board connectors, and more particularly to a fine-pitch high-speed hybrid cable-to-board connection system for mid-board connections. In a first embodiment, the connector comprises an electrically insulating housing having a base extending along orthogonal length (x) and width (y) directions of the connector and comprising opposing first and second major surfaces. A wall extends from the first major surface of the base along the length direction and along a height direction (z) of the connector perpendicular to the length and width directions. The wall comprises opposing first and second side surfaces extending along the length direction between opposing first and second end surfaces extending along the width direction; and a top surface extending between the first and second side surfaces and the first and second end surfaces. The connector also includes parallel rows of first and second terminals disposed in the housing, where each first and second terminal comprises a terminal portion and a mating portion. The terminal portion extends along the width direction, is disposed at least partially in the base, and is configured to make contact with an electrically conductive trace of a circuit board. The mating portion extends along the height direction and is disposed at least partially in the wall, the mating portions of the first and second terminals adjacent the respective first and second side surfaces of the wall and configured to contact mating portions of terminals in a mating connector. The wall defines a cavity formed therein between the first and second terminals, such that the cavity extends to and defines a first cavity opening at the top surface of the wall. An optical relay portion comprising a circuit board for mounting an optoelectronic device is disposed in the cavity, and the circuit board has a plurality of electrically conductive traces that are electrically connected to at least some of the first and second terminals.

In a second embodiment, a connector has an electrically insulating housing comprising a base (310) extending along orthogonal length (x) and width (y) directions of the connector and comprising opposing first and second major surfaces, opposing first and second side walls extending from the first major surface of the base along the length direction and along a height direction (z) of the connector perpendicular to the length and width directions, each side wall comprising opposing internal and external side surfaces, and parallel rows of first and second terminals disposed in the housing. Each first and second terminal has a terminal portion extending along the width direction and disposed at least partially in the base and configured to make contact with an electrically conductive trace of a circuit board and a mating portion extending along the height direction, the mating portions of the first and second terminals adjacent the respective internal surfaces of and disposed at least partially in the first and second side walls and configured to contact terminals of a mating connector. The first and second side walls define a first cavity therebetween for receiving a male portion of a mating connector therein. The housing defines a second cavity extending between and defining first and second openings at the respective second major surface of the base and the first cavity. An optical relay portion is disposed in the second cavity for relaying light between the first and second openings, wherein the optical relay system comprising at least one of an optical lens, an optoelectronic device, and an optical waveguide.

In a third embodiment, a connector comprises an electrically insulating housing having parallel rows of first and second terminals disposed in the housing. Each first and second terminal includes a terminal portion configured to make contact with an electrically conductive trace of a circuit board; and a mating portion configured to contact a terminal of a mating connector, the mating portions of the first terminals parallel to and facing the mating portions of the second terminals. The housing defines a cavity formed therein between the mating portions of the first and second terminals, wherein the cavity defining a cavity opening at an external surface of the housing for receiving light therefrom. An optical relay portion is disposed in the cavity, wherein the optical relay portion comprises at least one of an optical transceiver, an optical lens and an optical waveguide.

In a fourth embodiment a hybrid cable-to-board interconnection system is described. The interconnection system comprises a high-speed board connector, wherein the board connector comprises a base that holds parallel rows of first electrical terminals and second electrical terminals, wherein each of the first and second electrical terminals has a terminal portion disposed at least partially in the base and wherein the terminal portion is configured to make contact with an electrically conductive trace of a first circuit board and a mating portion extending generally perpendicular from the terminal portion along a height direction of the base; and a high-speed cable connector, wherein the cable connector comprises a housing that holds parallel rows of first electrical terminals and second electrical terminals, wherein each of the first and second electrical terminals has a terminal portion disposed at least partially in the base and wherein the terminal portion is configured to make contact with one of an electrically conductive trace of a second circuit board or an electrical conductor and a mating portion extending generally perpendicular from the terminal portion along a height direction of the housing, wherein the first and second terminals of the board connector are configured to contact corresponding first and second terminals of the cable connector. The interconnection system further comprises an optical relay portion in at least one of the high-speed board connector and high-speed cable connector includes to transmit signals carried by an optical waveguide to the first printed circuit board.

The terms "optical waveguide" or "waveguide" can be any suitable waveguide element including, for example, a glass or plastic optical fiber, or a channel or planar waveguide fabricated from polymer or inorganic materials, a plastic optical fiber, etc. In some cases, the optical waveguide can be a single mode or multimode optical fiber suitable for wavelengths in a range from about 600 nanometers to about 2000 nanometers. In one particular embodiment, the refractive index profile of the optical waveguide/fiber can have a circular cross-sectional profile. In some cases, however, the optical waveguide/fiber can instead have a rectangular of polygonal refractive index profile.

BRIEF DESCRIPTION OF THE DRAWINGS

The present invention will now be described with reference to the accompanying drawings in which:

FIGS. 4A and 4B are two cross-sectional views of an exemplary hybrid high-speed cable connector and a hybrid high-speed board connector that make up the a hybrid high-speed cable-to-board interconnection system according to an aspect of the invention;

Figure 1:
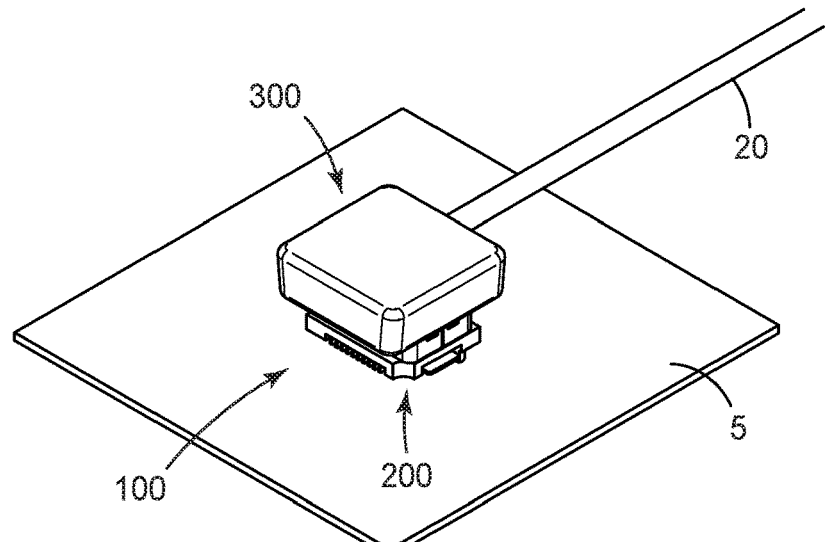
FIG. 1 is an isometric view of an exemplary hybrid high-speed cable-to-board interconnection system according to an aspect of the invention.

While the above-identified drawing figures set forth several embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale. Like reference numbers have been used throughout the figures to denote like parts.

DETAILED DESCRIPTION OF THE DRAWINGS

The disclosure generally relates to hybrid connectors useful for simultaneously connecting one or more optical waveguides, such as in optical fiber ribbon cables, and one or more electrical signal lines to a printed circuit board.

In the following detailed description of the preferred embodiments, reference is made to the accompanying drawings that form a part hereof. The accompanying drawings show, by way of illustration, specific embodiments in which the invention may be practiced. It should be understood that other embodiments may be utilized and structural or logical changes may be made without departing from the scope of the present invention. The following detailed description, therefore, is not to be taken in a limiting sense, and the scope of the invention is defined by the appended claims.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise. Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming being "on" "connected to,"

"coupled with" or "in contact with" another element, component or layer, it can be directly on, directly connected to, directly coupled with, in direct contact with, or intervening elements, components or layers may be on, connected, coupled or in contact with the particular element, component or layer, for example. When an element, component or layer for example is referred to as being "directly on," "directly connected to," "directly coupled with," or "directly in contact with" another element, there are no intervening elements, components or layers for example.

One key to the large-scale penetration of optical fiber into electronic equipment is the development of connectors that not only provide adequate optical performance, but are low cost, rugged, and allow graceful migration from copper interconnect media to optical fiber-based solutions. The present invention seeks to create a hybrid cable-to-board connector assemblies for mid-plane applications. The exemplary connector can provide connectivity for both copper cables and optical waveguides (e.g. optical fibers) with a printed circuit board. In an exemplary aspect, the new hybrid connector can be created by transforming an existing low profile fine-pitch high-speed board to board electrical connector to include optical relay portion.

An existing low profile fine-pitch high-speed board to board electrical connector may be able to support data rate of more than 10 Gbps/channel. This conventional electrical connector can be configured between 0.5 mm to 1 mm pitch with up to a 180 pin count. One exemplary low profile fine-pitch high-speed board to board electrical connector is described in US Publication No. 2014-0335727, herein incorporated by reference. The existing low profile fine-pitch high-speed board to board electrical connector includes an electrically insulating housing configured to hold a plurality of electrical contacts or terminals arranged in parallel rows wherein each terminal comprises a terminal portion extending along the width direction and disposed at least partially in the housing and configured to make contact with an electrically conductive trace of a circuit board; and a mating portion extending along the height direction and disposed at least partially in a wall of the housing to connect with terminals in a mating connector.

FIG. 1 shows an exemplary hybrid high-speed cable-to-board interconnection system 100. Interconnection system 100 comprises a hybrid high-speed board connector 200 and a hybrid high-speed cable connector 300 that are configured to be mated together to transmit high-speed signals to a printed circuit board (PCB) 5. Interconnection system 100 includes an optical relay to enable the transmission of optical signals to the PCB. The optical relay is made of up of an optical relay portion in at least one of the hybrid high-speed board connector 200 and hybrid high-speed cable connector 300. The hybrid cable connector 300 is mounted on the terminal end of at least one high-speed fiber optic cable 20 that includes at least one optical fiber.

The exemplary interconnection system 100 can be used to electro-optically and/or optically interconnect two printed circuit boards (PCBs) without the need for a mid-plane connection system, thus improving the design flexibility of electronic equipment having a plurality of PCBs. Alternatively, interconnection system 100 can be used to interconnect two separate pieces of electronic equipment. The exemplary cable assembly can provide a high-speed connection (i.e. having data transmission rates over about 10 Gb/s) between either two PCBs, two pieces of electronic equipment or to connect a piece of electronic equipment to a PCB.

Figure 2:
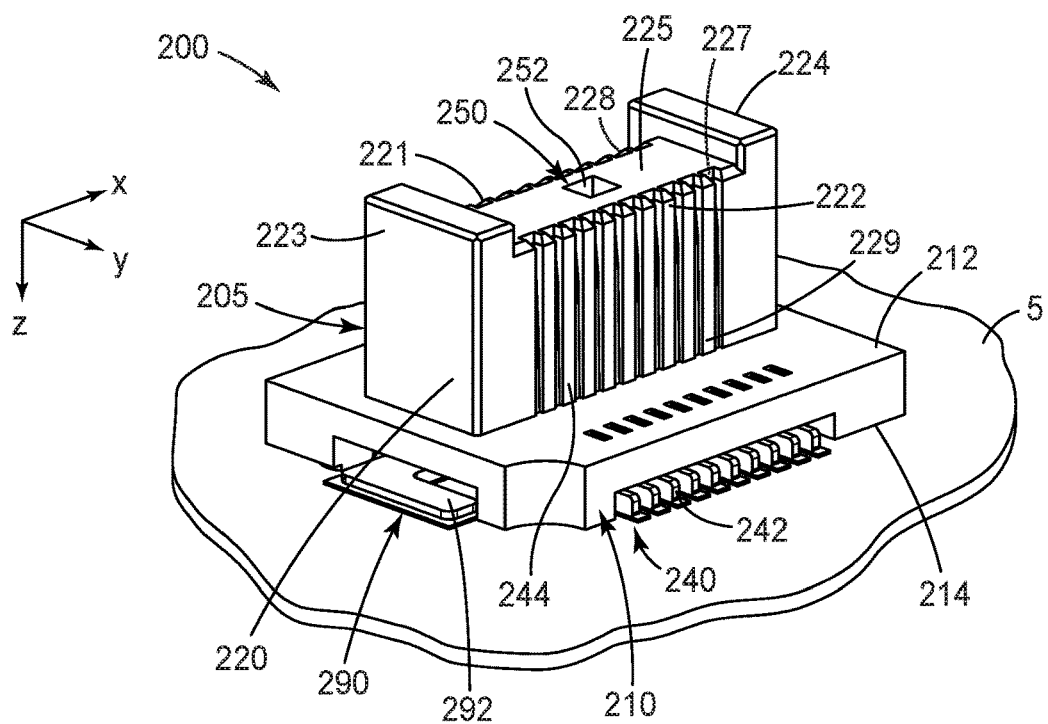
FIG. 2 is an isometric view of an exemplary hybrid high-speed board connector according to an aspect of the invention.
Figure 3A:
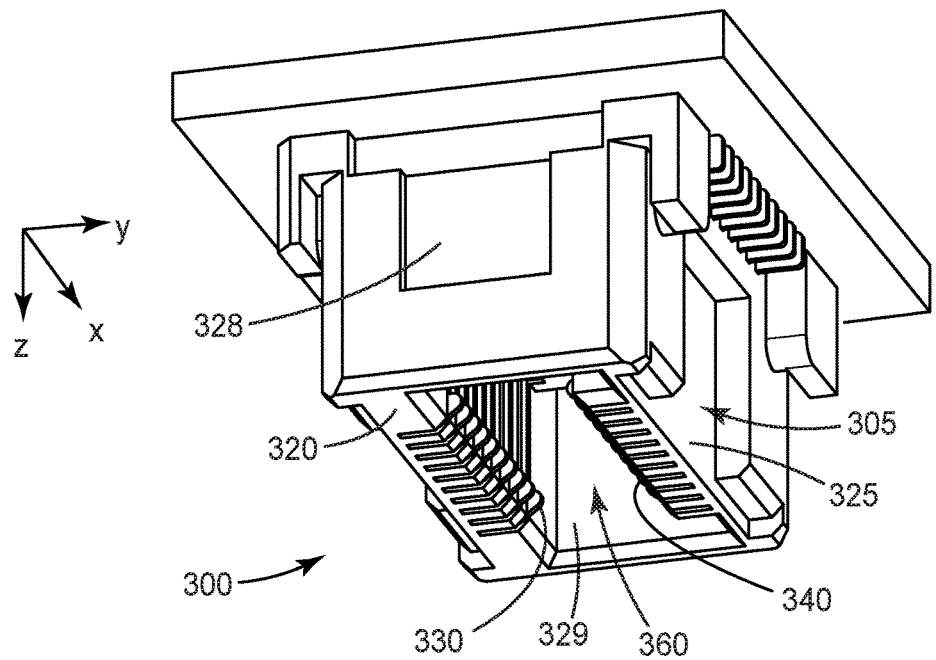
FIGS. 3A and 3B are two views of an exemplary hybrid high-speed cable connector according to an aspect of the invention.
Figure 3B:
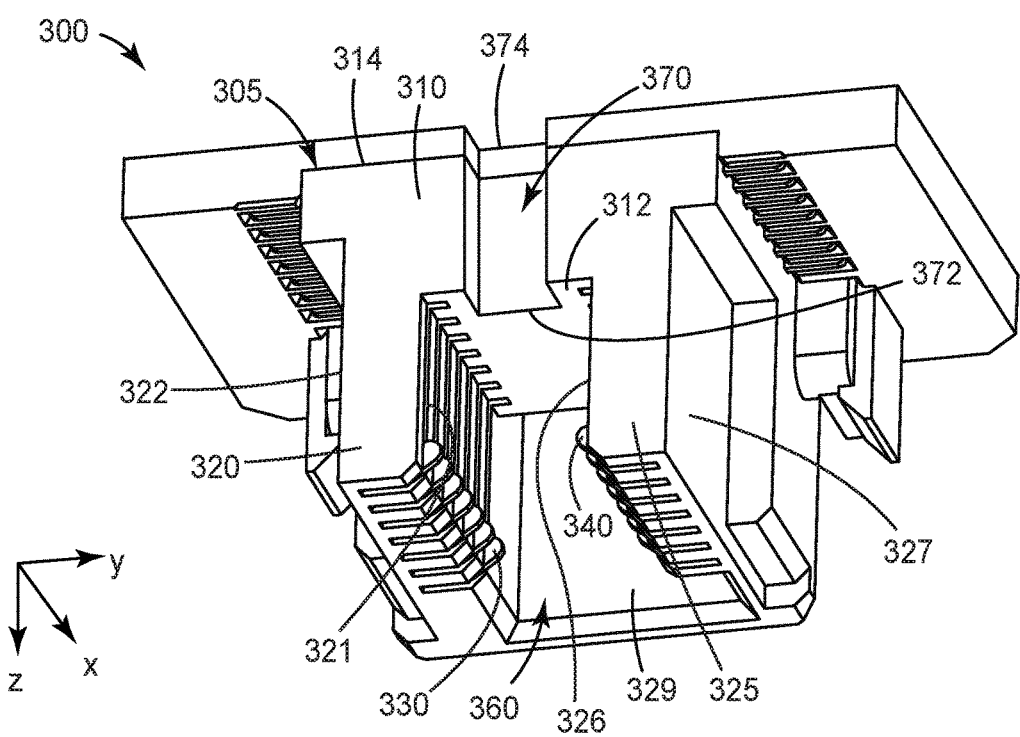
Figure 5A:
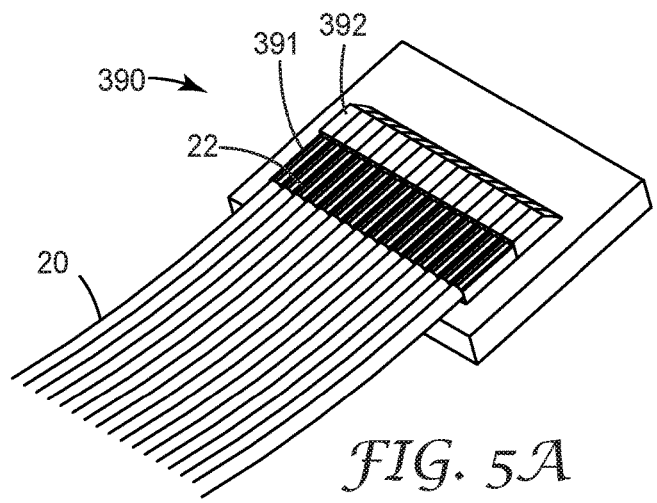
FIGS. 5A-5C are three views of an optical relay system that can be used in a hybrid high-speed cable connector according to an aspect of the invention.
Figure 5B:
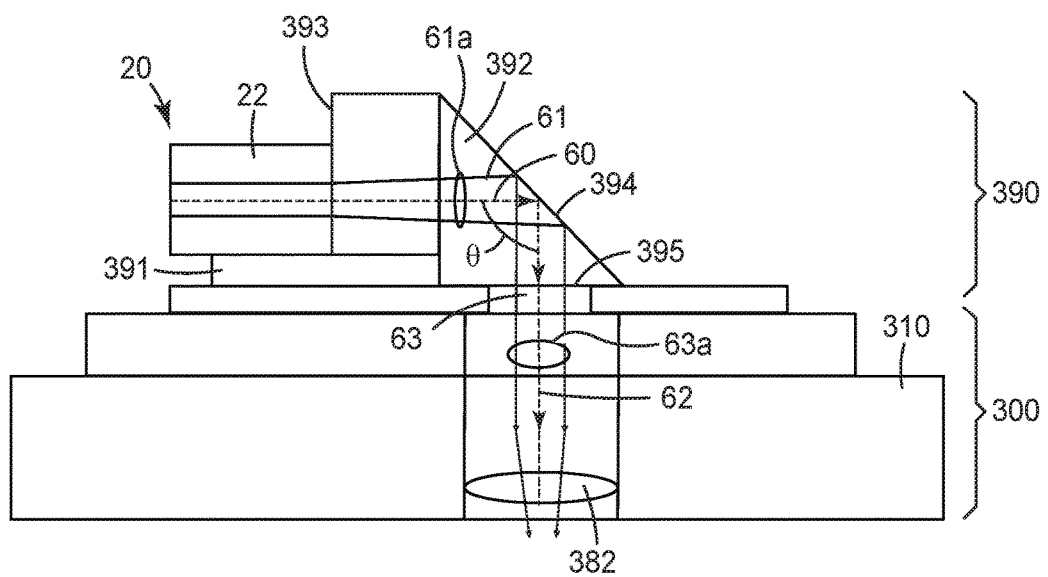
Figure 5C:
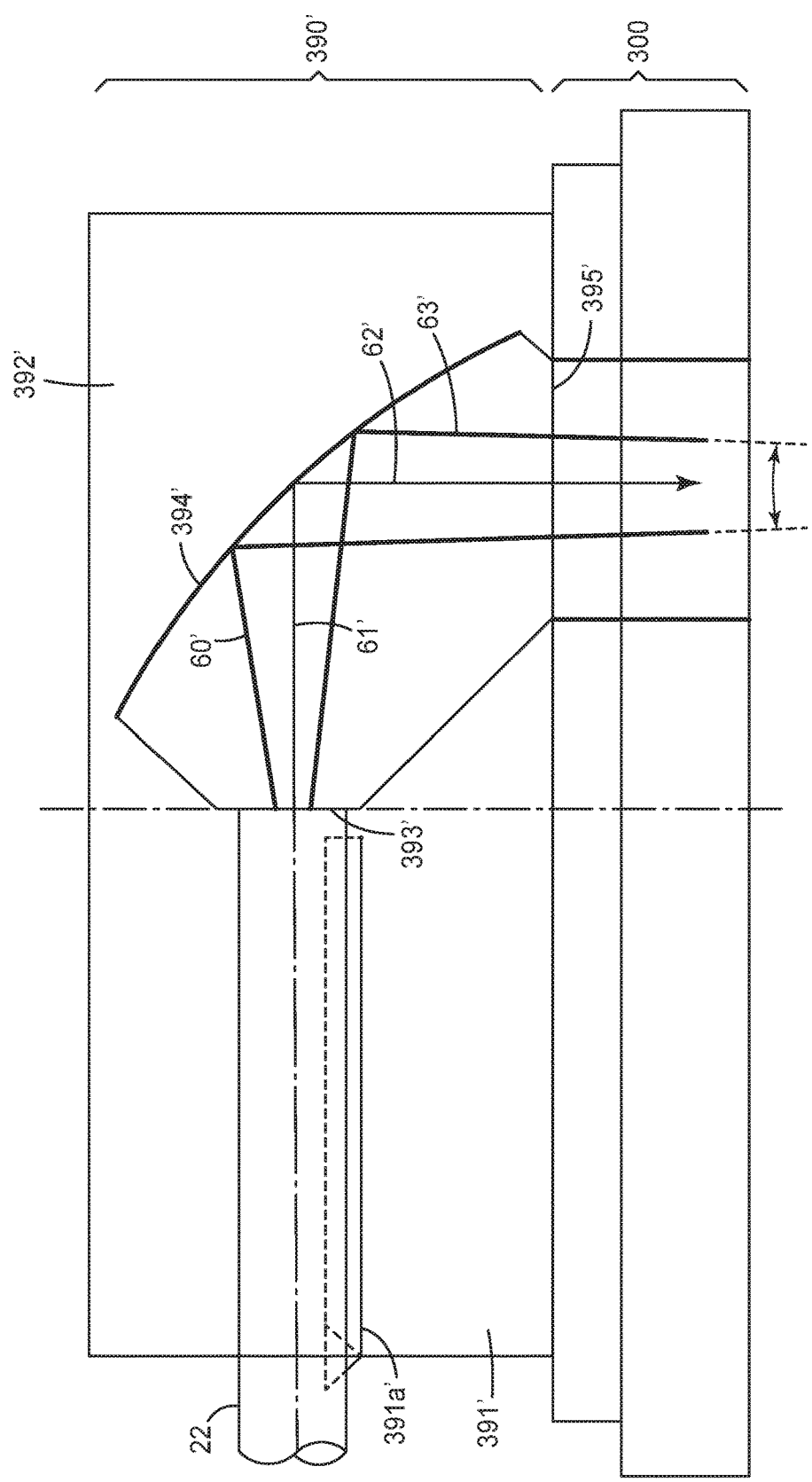

The two connectors which make up hybrid high-speed cable-to-board interconnection system 100 will be explained in more detail with respect to FIGS. 2-5. FIG. 2 shows an exemplary hybrid high-speed board connector 200 while FIGS. 3A and 3B are two views of an exemplary hybrid high-speed cable connector 300. FIGS. 4A and 4B are cross-sectional views showing hybrid high-speed cable connector 300 and hybrid high-speed board connector 200 in an unconnected and a connected state and FIGS. 5A-5C illustrate aspects of the optical relay portion for the exemplary hybrid high-speed cable connector 300.

Referring to FIGS. 2, 4A and 4B, hybrid high-speed board connector 200 comprises an insulating plug body or housing 205 formed from an electrically insulating material and which can be formed using conventional injection molding techniques. Housing 205 has a base 210 that extends along an orthogonal length (x) and width (y) directions of the board connector. Base 210 has a first major surface 212 and a second major surface 214 opposite the first major surface. A wall 220 extends perpendicularly from the first major surface of the base along the length direction and along a height direction (z) of the connector perpendicular to the length and width directions. Wall 220 includes a first side surface 221 and a second side surface 222 extending along the length direction of the wall between a first end surface 223 and a second end surface 224 that extend in the width direction between the first and second side surfaces. The wall also includes a top surface 225 extending between the first and second side surfaces and the first and second end surfaces.

The hybrid high-speed board connector 200 also includes parallel rows of first electrical contacts or terminals 230 and second electrical contacts or terminals 240 disposed at least partially in housing 205. In an exemplary aspect, the first and second terminals 230, 240 can have a generally L-shape. Each of the first and second terminals comprises a terminal portion 232, 242 and a mating portion 234, 244. The terminal portion 232, 242 is disposed at least partially in the housing and extends along the width direction, and can be configured to make contact with an electrically conductive trace of a circuit board 5. Mating portion 234, 244 is disposed at least partially in the wall 220 and extends along the height direction and disposed at least partially in the wall. The mating portions of the first and second terminals can be adjacent the respective first and second side surfaces 221, 222 of the wall respectively and can be configured to contact terminals of a mating connector. In some embodiments, the number of parallel rows of electrical terminals present in board connector 200 corresponds to that number of electrical contacts or terminals present in the mating connector, for example, cable connector 300. For example, the board connector may comprise 2, 3, or 4 rows of electrical terminals. While in other embodiments, some of the electrical signals will be converted to optical signals requiring fewer terminals in at least one of the board connector and/or the cable connector.

In one embodiment, wall 220 can include a plurality of guiding slots 227, 228 formed in the first side surface 221 and the second side surface 222 for guiding the electrical terminals of a mating electrical connector, such as electrical terminals 330, 340 of cable connector 300, into alignment and mating engagement with the electrical terminals 230, 240 of board connector 200. Each guiding slot accommodates one electrical terminal. The mating portion 234, 244 of each electrical terminal 230, 240, respectively, is recessed and exposed in each guiding slot so that the electrical terminals of the mating connector easily engages the electrical terminals 230, 240. Ribs 229 separate the guiding slots 227, 228 and can be configured to engage corresponding ribs of the socket connector 300 to guide and align the initial mating of the board connector 200 with a mating connector.

Wall 220 can have a cavity 250 formed in the top surface 225 thereof between the first and second terminals 230, 240. The cavity extends from a first cavity opening 252 at the top surface of the wall into the interior of the wall as shown in FIGS. 4A and 4B.

An optical relay portion 280 can be disposed within the cavity wherein the optical relay portion can comprise one or more lenses, optical waveguides, or optoelectronic devices or transceivers disposed on a secondary circuit board. For example, optical relay portion 280 can include an optical transceiver 270 mounted on secondary circuit board 275 disposed in the cavity 250, wherein the secondary circuit board comprises a plurality of electrically conductive traces 289a, 289b that are electrically connected to at least some of the first and second terminals.

In some embodiments, board connector 200 may include, an internal shield 290 situated within wall 200 between the first and second terminals 230, 240 so as to shield each parallel row of terminals from the other to mitigate a variety of signal-degrading phenomena such as noise or electromagnetic interference (EMI) generated by either row. The internal shield may have an external ground tab 292 that can be connected to ground through PCB 5 as shown in FIG. 2.

Referring to FIGS. 3A, 3B, 4A and 4B, hybrid high-speed cable connector 300 comprises an electrically insulating plug body or housing 305 formed from an electrically insulating material which can be formed using conventional injection molding techniques. Housing 305 has a base 310 that extends along an orthogonal length (x) and width (y) directions of the board connector. Base 310 has a first major surface 312 and a second major surface 314 opposite the first major surface. A first side wall 320 and second side wall 325 extending from the first major surface of the base along the length direction and along a height direction (z) of the connector perpendicular to the length and width directions between first and second end walls 328 and 329. Each side wall comprises an internal side surface 321, 326 and an external side surface 322, 327 opposite the internal side surface.

The hybrid high-speed cable connector 300 also includes parallel rows of first electrical contacts or terminals 330 and second electrical contacts or terminals 340 disposed at least partially in housing 305. In an exemplary aspect, the first and second terminals 330, 340 can have a generally L-shape. Each of the first and second terminals comprises a terminal portion 332, 342 and a mating portion 334, 344. The terminal portion 332, 342 is disposed at least partially in the housing and extends along the width direction, and can be configured to make contact with an electrically conductive trace (not shown) of a circuit board 5 or with an electrical conductor 14 from an electrically conductive cable 10 (not shown). The mating portion 334, 344 of the terminals 330, 340 is disposed at least partially in the internal side surface 321, 326 of side walls 320, 325, respectively. The mating portions extends along the height direction and is disposed at least partially in the side walls. The mating portions of the first and second terminals can be adjacent the respective first and second side surfaces 321, 326 of the wall, respectively, and can be configured to contact terminals of a mating connector.

First and second side walls 320, 325 define a first cavity 360 therebetween for receiving a portion of a mating connector therein, such as wall 220 of board connector 200. The housing can further include a second cavity 370 extending between the first major surface 312 and a second major surface 314 of base 310. For example, the first major surface can have a first opening 372 and the second major surface 314 can have a second opening 374, wherein the second cavity extends from the first opening to the second opening such that it extends through base 310.

Cable connector 300 includes an optical relay portion 380 that is configured to receive optical signals from at least one optical fiber or waveguide in one or more optical cables. In an exemplary aspect, the at least one optical fiber cable can comprise a hybrid cable having at least two parallel optical fibers within a protective layer and at least one electrical conductor. In an alternative aspect, optical relay portion 380 can be configured to accept signals from one or more individual optical fibers in hybrid electrical-optical cables. In yet another exemplary aspect, the at least one optical fiber cable can be an optical fiber ribbon cable having at least two parallel optical fibers within a protective layer. In an alternative aspect, optical relay portion 380 can be configured to accept signals from one or more individual optical fibers or optical fiber cables. Optical relay portion 380 can include a fiber connection system disposed adjacent to the second major surface 314 of base 310 and at least optoelectronic device, a lens or an optical waveguide. In the exemplary embodiment shown in FIGS. 4A and 4B, the optical relay portion in cable connector 300 includes a fiber connection system 390, an optical lens 382 and an optical waveguide 384. In an exemplary aspect, the optical waveguide 384 can be a glass or plastic fiber, or a plastic or inorganic channel or planar waveguide. In an exemplary aspect, the optical lens can be a collimating lens or a converging lens, or a collimating or converging reflective element as shown in FIGS. 5A and 5B.

In an exemplary aspect, fiber connection system 390 can include an expanded beam connector to facilitate coupling of the light from an optical waveguide(s) into the exemplary connectors described herein. Expanded beam connectors can be more tolerant of dust/debris in the optical path than non-expanded-beam connectors, such as a physical contact connectors where the cores of the optical fibers are pushed together hard enough to effectively remove the interface or optical fiber connectors that have an index-matching oil/gel between the fibers. This is because the debris particle blocks a smaller percentage of the whole beam in an expanded beam connector than in a non-expanded-beam connector. Expanded beam connectors can also be more tolerant of lateral misalignment (i.e. mechanical misalignments that are orthogonal to the direction of the beam). While angular alignment of expanded beam connectors can be more sensitive, angular misalignments can be easier to control than lateral misalignment. The easing of lateral relaxed alignment tolerance provides better manufacturing yield, and less sensitivity to thermal expansion effects, etc. Finally, expanded beam connectors can be more tolerant of longitudinal (along the beam direction) misalignment, since the collimation of the light makes the collection efficiency of the receiving ferrule only weekly dependent on distance between the transmitting ferrule and the receiving ferrule.

Two exemplary fiber connection systems 390, 390' are described in reference to FIGS. 5A-5C. For example in FIGS. 5A and 5B, fiber connection system 390 includes at least one waveguide alignment member 391 and a light redirecting element 392. The fiber connection system 390 can receive light emerging from the optical waveguide or fiber 22 which it redirects to an optical relay portion in either of the hybrid high-speed board connector 200 and/or the hybrid high-speed cable connector 300 (FIG. 4B). Alternatively, it will be appreciated that the fiber connection system may be operated in the scenario wherein the fiber connection system receives light emitted by the optoelectronic device/optical relay portion and redirects the light to the optical waveguide. In other aspects, fiber connection system 390 can provide two-way communication/signal transmission between the optical waveguide and the optoelectronic device/optical relay portion(s). An exemplary fiber connection system is described in US Publication No. 2016-0231521, which is incorporated herein by reference.

In the exemplary aspect shown in FIG. 5A, fiber connection system 390 includes a plurality of waveguide alignment members 391 and a light redirecting elements 392 and shows the attachment of several optical fibers 22 to the fiber connection system 390. The optical fibers are aligned and permanently attached in grooves formed in a surface of the waveguide alignment members. In one aspect, the grooves can be V-grooves into which the optical fibers can be attached by an adhesive such as an index matched epoxy adhesive such as is described by U.S. Provisional Patent Application 62/394,562, which is incorporated herein by reference. The fiber connection system also includes an array of light redirecting elements 392, one for each optical fiber 22 attached to fiber connection system 390. Each optical fiber 22 is situated so as to be able to direct light emerging from the optical waveguide into a first side 393 or face of light redirecting element 392 as illustrated in the schematic drawing shown in FIG. 5B. In some embodiments, the light redirecting element 392 comprises a reflective surface, a reflective lens, and/or a prism.

With reference to FIG. 5B which is a schematic cross-section of fiber connection system 390, the optical fiber 22 is aligned in a groove (not shown) and may be permanently attached to it. At the point of attachment, the fiber buffer and protective coating 23 (if any) have been stripped away to allow only the bare optical fiber to lie aligned and permanently affixed to the groove. Light redirecting element 392 includes first side 393 for receiving input light from the optical fiber disposed and aligned in a waveguide alignment member 391. Light redirecting element 392 also includes light redirecting portion 394 for receiving light from the first side 393 along an input direction and redirecting the light along a different redirected direction. The light redirecting element 392 also includes second side 395 that receives light from light redirecting portion 394 of light redirecting element 392 and transmits the received light as output light along an output direction.

The light redirecting portion 394 can be any suitably shaped reflector capable for redirecting the input light beam 60 so that it exits the light redirecting element in a different direction, such as direction 62, and can have a flat angled surface, a toroidal surface, a parabolic surface, a spherical surface, a hyperbolic surface, or an elliptical surface. The light redirecting portion 394 can be made to be reflective by relying on total internal reflection, or by including a reflective coating, such as, for example, a multilayer interference reflector such as a Bragg reflector, or a metal or metal alloy reflector. In one exemplary aspect, light redirecting portion 394 can be a solid body reflector. For example, light redirecting portion 394 can be a transparent optical polymer prism that employs total internal reflection. In an exemplary aspect, the light redirecting portion can include integrally molded fiber holding grooves.

In some cases, the light redirecting portion 390 can comprise a solid medium that is transparent to the wavelength of light input from the optical waveguide and has an index of refraction that is greater than one. In some cases, the end face of the optical fiber 22 can be immediately adjacent the input surface or first side 393 of the light redirecting portion. Alternatively, an index matching material can be optionally disposed between end face of the optical fiber and the first face of the redirecting element, optically coupling the optical fiber to the input surface/first side of the light redirecting portion. In some cases, the light redirecting portion can be a hollow cavity formed in the connector housing as shown in FIG. 5C.

The optical fiber 22 is characterized by a core size, and as the light beam 60 emerging from the optical fiber travels along direction 61, the light beam 60 diverges to a diameter greater than the core size of the optical fiber. The expanded light beam travels along direction 61 until it encounters redirecting element 392. Light beam 60 enters redirecting element 392 through first side 393 until the light beam contacts light redirecting portion 394. The light redirecting portion 394 reflects the expanded light beam along direction 62 changing the direction of the light beam. In addition the redirecting element 392 can also change the divergence of the light beam 60 and may collimate the light beam. Light beam 63 that emerges from the second side 395 of redirecting element 392 travels along direction 62 where it may encounter a refractive element or lens 382. The lens 382 can change the divergence of the light beam 63 to further focus the light beam which can be focused on a photodetector or transceiver, such as transceiver 270 shown in FIGS. 4A and 4B.

Each optical waveguide 22 has a first core size, and an associated first optical mode profile 61a having a spatial extent that is dependent on the core geometry and on the wavelength of light. The corresponding redirecting element for each optical waveguide can be configured to change the divergence of light emerging from the optical fiber such that light emanating from the optical waveguide exits the fiber connection system propagating along an exit direction that is different from the mating direction of the connector light coupling unit. The redirection angle, θ, or angle between the entering direction and the exiting direction can be any desired angle suitable for the application, and can be, for example, more than 90 degrees, or about 90 degrees, or about 80 degrees, or about 70 degrees, or about 60 degrees, or about 50 degrees, or about 40 degrees, or about 30 degrees, or even less than about 30 degrees. In one particular embodiment shown in FIG. 5B, the redirection angle is about 90 degrees.

The emanating light (i.e. light beam 63) may be an expanded beam having an expanded beam profile 63a wherein the expanded beam profile has a second spatial extent greater than the first core spatial extent due to the interaction of the light with the light redirecting element, e.g., a curved surface of the light redirecting element. In some embodiments, the ratio of the second spatial extent to the waveguide mode profile spatial extent can be at least 2, at least 3.7, or even at least 5.

In some cases, at least one of the first side, light redirecting portion, and the second side of the light redirecting element includes one or more curved surfaces for changing a divergence of light that exits optical fiber. For example, FIG. 5C shows fiber connection system 390' having an optical fiber 22 disposed in a groove 391a' in waveguide alignment member 391'. At the point of attachment, the fiber buffer and protective coating (if any) have been stripped away so that the bare optical fiber 22 is aligned and permanently affixed in the groove. Light redirecting element 392' includes first side 393' for receiving input light from the optical fiber disposed and aligned in the waveguide alignment member. The light redirecting element can include a hollow cavity with mirrored/reflective walls such as curved light redirecting portion 394' for receiving light from the first side 393' along an input direction and redirecting the light along a different redirected direction. The light redirecting element 392' has a second side 395' that receives light from light redirecting portion of light redirecting element and transmits the received light as output light along an output direction.

The optical fiber 22 is characterized by a core size, and as the light beam 60' emerging from the optical fiber travels along direction 61', the light beam 60' diverges to a diameter greater than the mode size of the optical fiber. The expanded light beam travels along direction 61' until it encounters redirecting element 392. Light beam 60 enters redirecting element 392' through first side 393' until the light beam contacts light redirecting portion 394'. The light redirecting portion 394' reflects the expanded light beam along direction 62' changing the direction of the light beam. In addition the redirecting element 392' can also change the divergence of the light beam 63' and may collimate the light beam. Light beam 63' that emerges from the second side 395' of redirecting element 392 travels along direction 62' where it may encounter the optical relay portion of the exemplary optical fiber.

The exemplary hybrid high-speed cable-to-board interconnection system 100 combines the features of a low profile fine-pitch high-speed board-to-board electrical connector with an additional optical overlay to provide an electrical/optical hybrid connector to support data rate more than 10 Gbps. The electrical terminal pitch in the exemplary connector can be configured between 0.5 mm to 1 mm pitch with up to 180 terminal count per connector.

Figure 6:
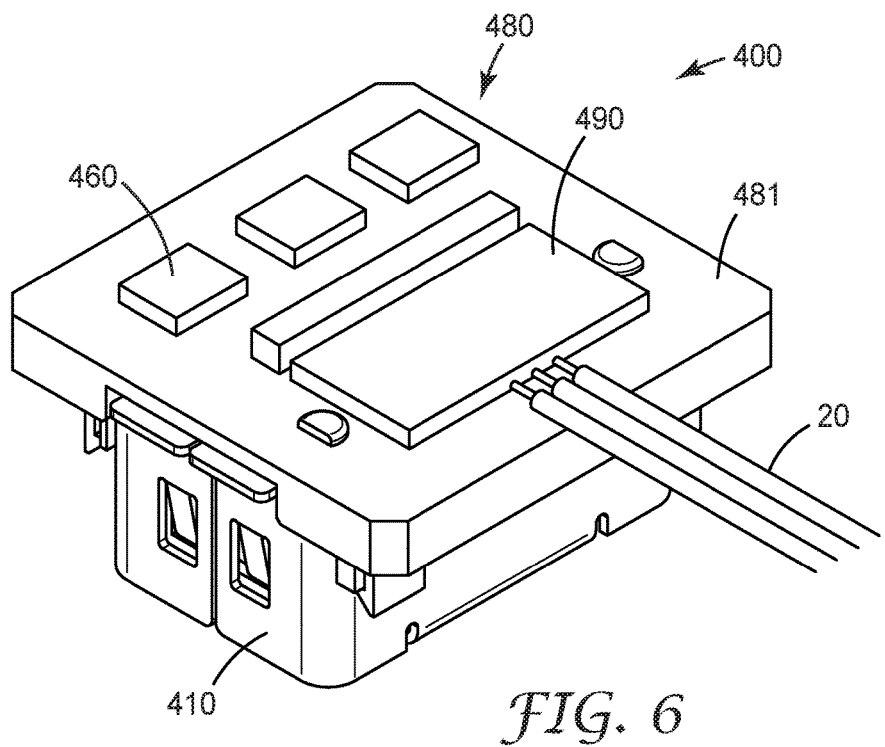
FIG. 6 is an isometric view of another exemplary hybrid high-speed cable connector according to an aspect of the invention.

A second hybrid high-speed cable connector 400 is shown in FIG. 6. Connector 400 is substantially the same as cable connector 300 with the addition of a secondary printed circuit board 481 disposed on the second major surface of the base of the connector. Cable connector 400 includes an optical relay portion 480 mounted on the secondary printed circuit board 481 that is mechanically attached to the housing 410 of the connector. In an exemplary aspect, optical relay portion 480 can be an optical transceiver portion that includes an a fiber connection system 490 and a board-mounted optical devices configured to convert the optical signals carried by the optical wave guides 20 into electrical signals that can be transmitted by the first and second terminals (such as terminals 330 and 340 in connector 300) to a mating connector such as a standard fine-pitch electrical connector such as is disclosed in PCT Publication No. WO 2013/012680, incorporated herein by reference.

Alternatively, the optical relay portion can include electronic chips 460, such as a transimpedance amplifier and/or a laser driver. The PCB can also include other electrical components such as capacitors, resistors, thermistors, etc. as dictated by the design and function of said secondary PCB.

Board-mount optical transceivers are needed for interconnect in data servers, telecom switches, and supercomputers for speeds above 25 Gbps per channel. Key to large-scale penetration into these applications is the development of connectors that not only provide adequate optical performance, but are low cost, rugged, and allow graceful migration from copper interconnect media.

Figure 7:
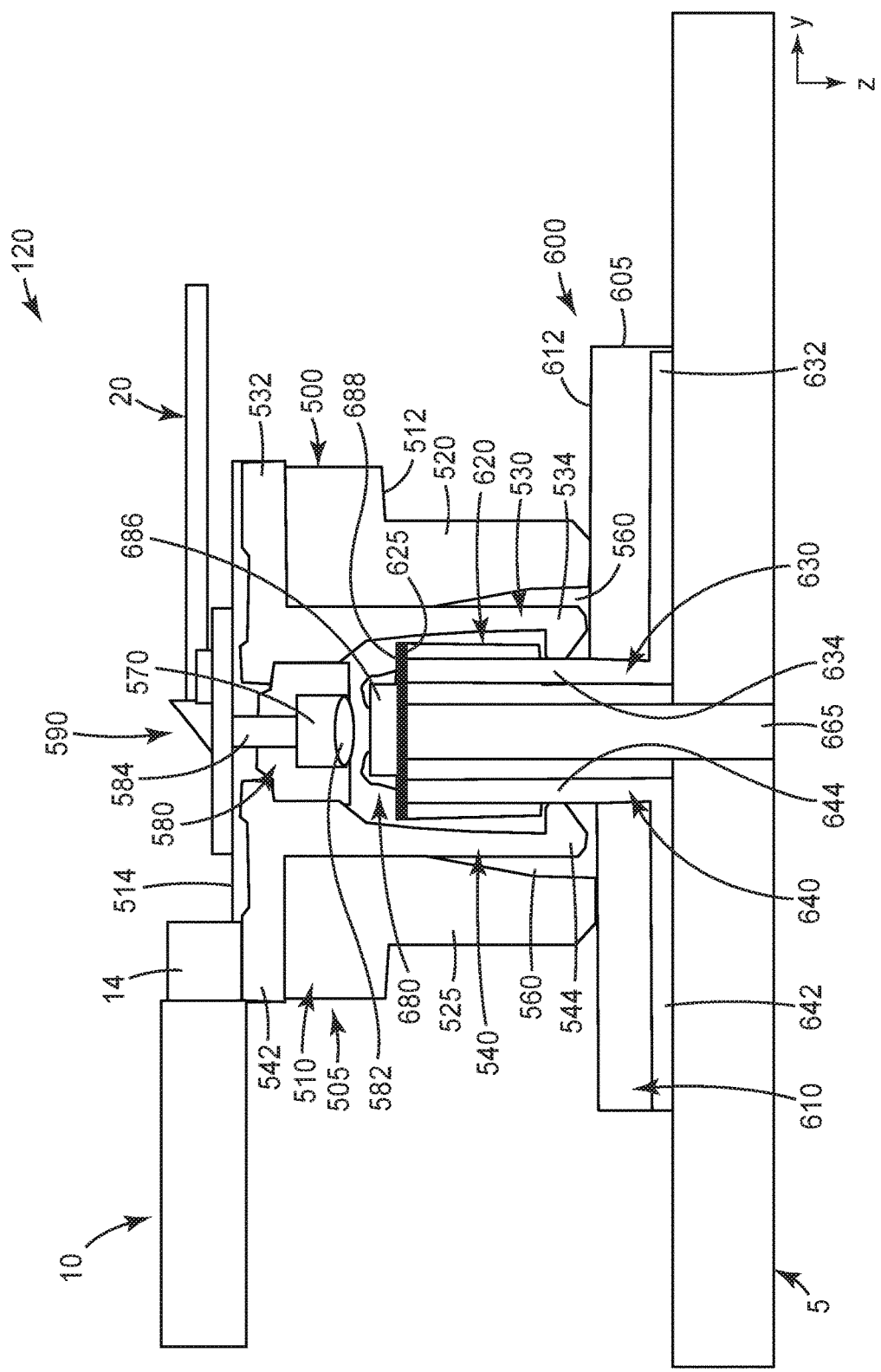
FIG. 7 is a cross-sectional view of a second exemplary hybrid high-speed cable-to-board interconnection system according to an aspect of the invention.

FIG. 7 shows an exemplary hybrid high-speed cable-to-board interconnection system 120. Interconnection system 120 comprises a hybrid high-speed cable connector 500 and a hybrid high-speed board connector 600 that are configured to be mated together to transmit high-speed signals to a PCB 5. Interconnection system 120 includes an optical relay to enable the transmission of optical signals from an incoming waveguide or optical fiber 20 to PCB 5. The optical relay is made of up of an optical relay portion in at least one of the hybrid high-speed board connector 600 and hybrid high-speed cable connector 500. The hybrid cable connector 600 is mounted on the terminal end of at least one high-speed fiber optic cable 20 that includes at least one optical fiber. In the exemplary embodiment illustrated in FIG. 7, interconnection system 120 comprises relay portions 580, 680 in both the hybrid board connector 600 and hybrid cable connector 500.

The exemplary interconnection system 120 can be used to couple signal transmission media (electrical conductors 14 and optical waveguide or optical fibers 20) with PCB 5 without the need for an optical mid-plane connection system.

Cable connector 500 comprises an electrically insulating plug body or housing 505 formed from an electrically insulating material which can be formed using conventional injection molding techniques. Housing 505 is similar to housing 305 of cable connector 300 shown in FIGS. 3A and 3B. In essence, housing 505 has a base 510 having a box-like structure extending from a first major surface 512, wherein the box-like structure comprises first and second side walls and between first and second end walls defining a first cavity 560 for receiving a portion of a mating connector therein.

The hybrid high-speed cable connector 500 also includes parallel rows of first electrical contacts or terminals 530 and second electrical contacts or terminals 540 disposed at least partially in housing 505. In an exemplary aspect, the first and second terminals 530, 540 can have a generally L-shape having a terminal portion 532, 542 and a mating portion 534, 544. The terminal portion 532, 542 is disposed at least partially in the housing and extends along the width direction, and can be configured to make contact with electrical conductor 14 from an electrically conductive cable 10. The mating portion 534, 544 of the terminals 530, 540 is disposed at least partially in the internal side surface of side walls 520, 525, respectively. The mating portions extends along the height direction and is disposed at least partially in the side walls. The mating portions of the first and second terminals can be adjacent the respective first and second side surfaces of the wall respectively and can be configured to contact terminals 630, 640 of a mating connector, such as board connector 600.

The housing can further include a second cavity 570 extending at least partially between the first major surface 512 and a second major surface 514 of base 510. An optical relay portion 580 can be at least partially held within the secondary cavity. Optical relay 580 can include a fiber connection system 590 disposed adjacent to the second major surface 514 of base 510 and at least an electro-optical device, a lens 582 or an optical waveguide 584 and can be configured to receive optical signals from at least one optical fiber 20 or waveguide cable. In an exemplary aspect, the at least one optical fiber cable can be an optical fiber ribbon cable having one or more optical fibers within a protective layer. In an alternative aspect, optical relay portion 580 can be configured to receive or transmit signals from one or more individual optical fibers or optical fiber cables. The fiber connection system 590 can be analogous to fiber connection system that was described previously in reference to FIGS. 5A-5C.

Board connector 600 comprises an insulating plug body or housing 605 formed from an electrically insulating material and can be formed using conventional injection molding techniques. Housing 605 is similar to housing 205 of cable connector 200 shown in FIGS. 2, 4A and 4B. Housing 605 has a base 610 that extends along an orthogonal length (x, extending into the page) and width (y) directions of the board connector and a wall 620 extends perpendicularly from the first major surface 612 of the base along the length direction and along a height direction (z) of the connector perpendicular to the length and width directions. Wall 620 includes a first and second side surfaces extending along the length of the wall between a first and second end surfaces. The wall also includes a top surface 625 extending between the first and second side surfaces and the first and second end surfaces.

Board connector 600 also includes parallel rows of first electrical contacts or terminals 630 and second electrical contacts or terminals 640 disposed at least partially in housing 605. In an exemplary aspect, the first and second terminals 630, 640 can have a generally L-shape comprising a terminal portion 632, 642 and a mating portion 634, 644. The terminal portion 632, 642 is disposed at least partially in the housing and extends along the width direction, and can be configured to make contact with an electrically conductive trace of a circuit board 5. Mating portion 634, 644 is disposed at least partially in the wall 620 and extends along the height direction and disposed at least partially in the wall. The mating portions of the first and second terminals can be adjacent the respective first and second side surfaces of the wall respectively and can be configured to contact terminals of a mating connector. The mating portion 634, 644 of each electrical terminal 630, 640, is configured to mate and provide electrical contact to terminals 530, 540 of the mating connector, (e.g. cable connector 500).

Board connector 600 includes an optical relay portion 680 comprising an optoelectronic device 686, such as an optical transceiver, a photodiode or a vertical-cavity surface-emitting laser (VCSEL), etc., disposed on a secondary circuit board 688. The optoelectronic device can be connected to electrically conductive traces in the secondary circuit board which can in turn be electrically connected to at least some of the first and second terminals 630, 640. For example, the photoelectronic device can be connected to electrically conductive traces in the secondary circuit board via wire bonds, physical contact of the mating portion of the first and second terminals with bond pads connected to the conductive traces, etc. Board connector 600 can further include a thermal slug 665 disposed beneath the secondary circuit board to facilitate removal of excess heat generated by the optoelectronic device. The thermal slug can conduct the heat away from the optoelectronic device to a heat spreader or heat sink (not shown) either within or adjacent to the PCB 5 and the end of the thermal stub.

Figure 8:
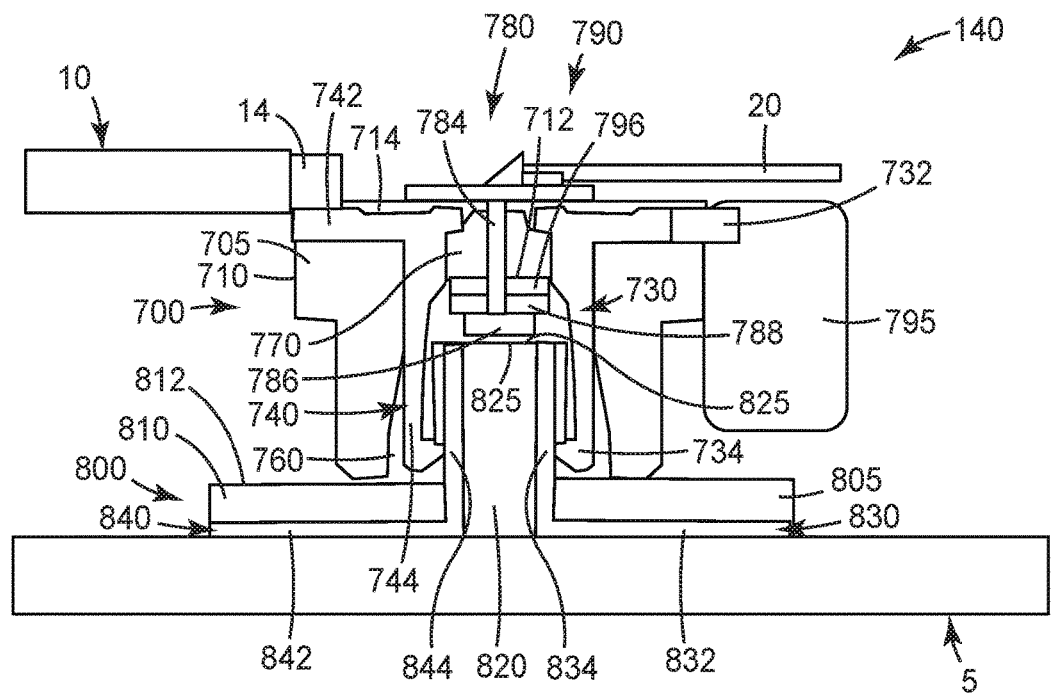
FIG. 8 is a cross-sectional view of a third exemplary hybrid high-speed cable-to-board interconnection system according to an aspect of the invention.

FIG. 8 shows an exemplary hybrid high-speed cable-to-board interconnection system 140. Interconnection system 140 comprises a hybrid high-speed cable connector 700 and a hybrid high-speed board connector 800 that are configured to be mated together to transmit high-speed optical and electrical signals to a printed PCB 5. Interconnection system 140 includes an optical relay to enable the transmission of optical signals from an incoming waveguide or optical fiber 20 to PCB 5. The optical relay is made of up of an optical relay portion 780 disposed in cable connector 700. The hybrid cable connector 700 is mounted on the terminal end of at least one high-speed fiber optic cable 20 that includes at least one optical fiber. The exemplary interconnection system 140 can be used to optically signal transmission media (electrical conductors 14 and optical waveguide or optical fibers 20) with PCB 5. In this embodiment there is no need for optical coupling between the cable connector and the board connector, because conversion between optical and electrical signals takes place in the cable connector 700.

Cable connector 700 comprises an electrically insulating plug body or housing 705 as described previously wherein the housing can be formed from an electrically insulating material which can be formed using conventional injection molding techniques. Cable connector 700 also includes parallel rows of first and second electrical contacts or terminals 730, 740 at least partially disposed in the housing. In an exemplary aspect, the first and second terminals 730, 740 can have a generally L-shape having a terminal portion 732, 742 and a mating portion 734, 744, as described previously. The terminal portions 732, 742 can extend along the width direction, and can be configured to make contact with electrical conductor 14 from an electrically conductive cable 10, while the mating portion 734, 744 of the terminals 730, 740 extend along the height direction and can be configured to contact terminals 830, 840 of a mating connector, such as board connector 800.

The housing can include a first cavity 760 disposed between the first and second terminals for receiving a portion of a mating connector therein and an optical relay portion 780. Optical relay 780 includes a fiber connection system 790 disposed adjacent to the second major surface 714 of base 710, an optical waveguide 784 extending through the base from the first major surface to a secondary circuit board 788, and optoelectronic device 786 disposed on the secondary circuit board. The optical relay portion being configured to receive optical signals from at least one optical fiber 20 or waveguide cable and convert the optical signal(s) to electrical signals which are transmitted to PCB 5 by the electrical terminals in exemplary cable-to-board interconnection system 140. The cable connector can further include a heat spreader 796 and/or a heat sink 795 attached to the optoelectronic device to pull excess heat away from said device.

Board connector 800 comprises an insulating plug body or housing 805 formed from an electrically insulating material and can be formed using conventional injection molding techniques as described previously. Housing 805 has a base 810 that extends along an orthogonal length (x) and width (y) directions of the board connector and a wall 820 extends perpendicularly from the first major surface 812 of the base along the length direction and along a height direction (z) of the connector perpendicular to the length and width directions. Wall 820 includes a first and second side surfaces extending along the length of the wall between a first and second end surfaces. The wall also includes a top surface 825 extending between the first and second side surfaces and the first and second end surfaces.

Board connector 800 also includes parallel rows of first electrical contacts or terminals 830 and second electrical contacts or terminals 840 disposed at least partially in housing 805. In an exemplary aspect, the first and second terminals 830, 840 can have a generally L-shape comprising a terminal portion 832, 842 and a mating portion 834, 844. The terminal portion 832, 842 is disposed at least partially in the housing and extends along the width direction, and can be configured to make contact with an electrically conductive trace of a circuit board 5. Mating portion 834, 844 is disposed at least partially in the wall 820 and extends along the height direction and disposed at least partially in the wall. The mating portions of the first and second terminals can be adjacent the respective first and second side surfaces of the wall respectively and can be configured to contact terminals of a mating connector. The mating portion 834, 844 of each electrical terminal 830, 840, is configured to mate and provide electrical contact to terminals 730, 740 of the mating connector, (e.g. cable connector 700).

Figure 9:
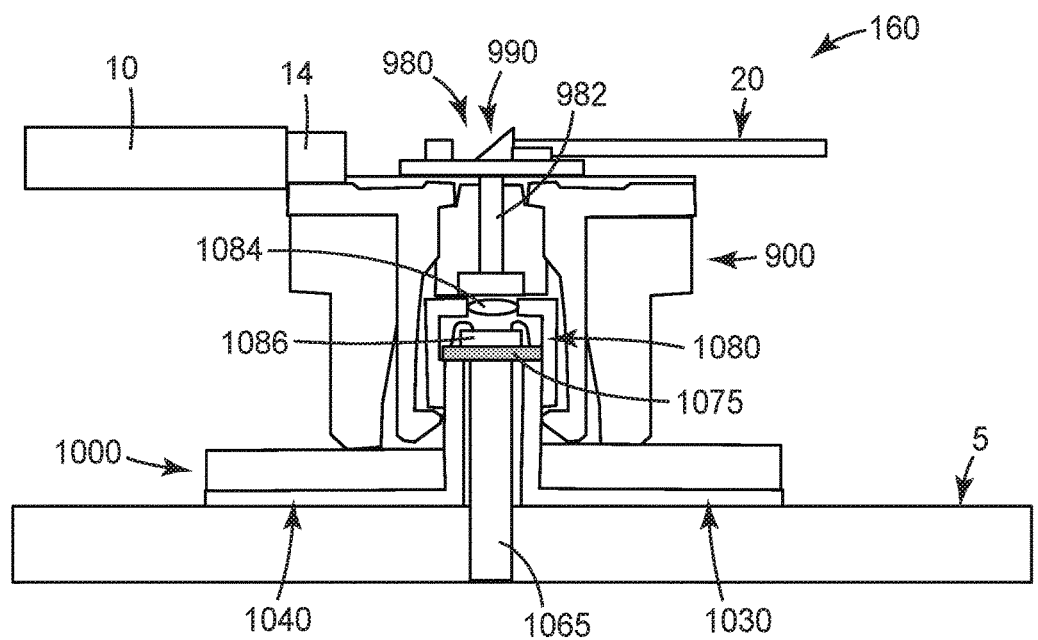
FIG. 9 is a cross-sectional view of a fourth exemplary hybrid high-speed cable-to-board interconnection system according to an aspect of the invention.

FIG. 9 shows a fourth exemplary cable-to-board interconnection system 160. Cable-to-board interconnection system 160 is similar to cable-to-board interconnection system 120 shown in FIG. 7 except that the focal lens 1084 in cable-to-board interconnection system 160 resides in the optical relay portion 1080 in board connector near optoelectronic device 1086. The optical relay portion 980 in the cable connector 900 includes fiber connection system 990 and an optical waveguide 982 which takes the output light beam from the fiber connection system and brings the light in close proximity of the focal lens 1084 in the board connector 1000 which focuses the light on optoelectronic device 1086 that is electrically connected to secondary circuit board 1075. The optoelectronic device transforms the optical signal to an electrical signal that is communicated to PCB 5 via first and second terminals 1030, 1040 and/or the optoelectronic device can transform an electrical signal into an optical signal which can then be transmitted by cable connector 900.

Board connector 1000 can further include a thermal slug 1065 beneath the secondary circuit board to facilitate excess heat generated by the optoelectronic device 1086. The thermal slug conducts heat away from the optoelectronic device to a heat spreader or heat sink (not shown) either within or adjacent to the PCB 5 and the end of the thermal stub.

Figure 10:
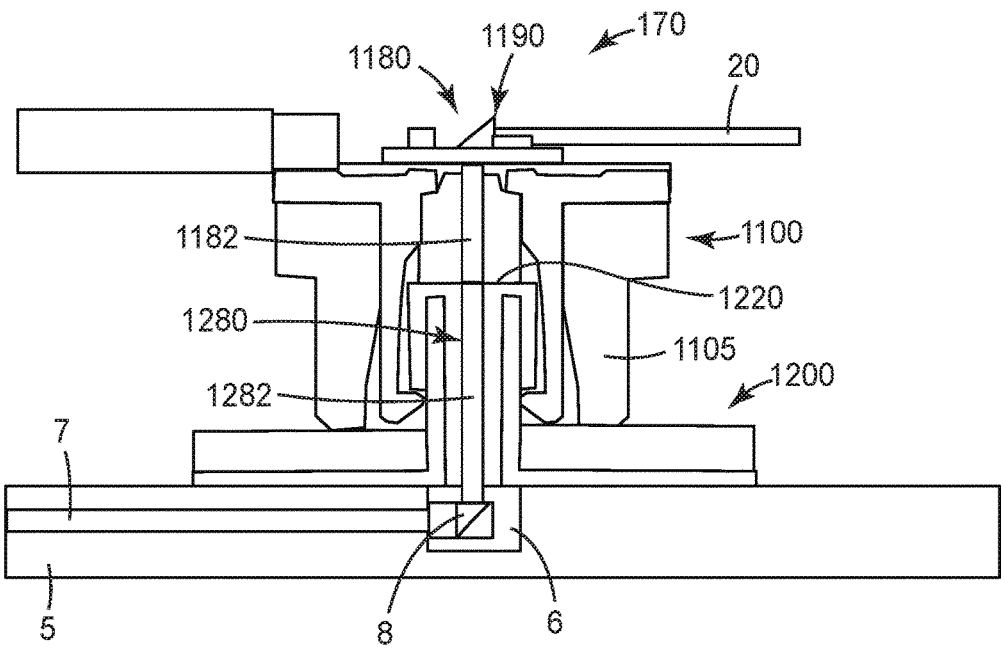
FIG. 10 is a cross-sectional view of a fifth exemplary hybrid high-speed cable-to-board interconnection system according to an aspect of the invention.

FIG. 10 shows yet another exemplary hybrid high-speed cable-to-board interconnection system 170 comprising a cable connector 1100 and a board connector 1200. In this embodiment the optical relay portion 1180 comprises an optical connection system 1190 which takes the signal from the optical fiber 20 and transmits it into an optical waveguide 1182 that passes through the housing 1105 of the cable connector 1100. The optical relay portion 1280 in board connector 1200 comprises an optical wave guide 1282 extending from the top surface of wall 1220 to the bottom of the connector. The light can be transferred into an embedded waveguide 7 within PCB 5. For example, PCB 5 can have a well 6 formed in the top surface thereof. Redirection optics 8 can be disposed in the bottom of the well 6 to alter the direction of the light entering the well so that is will be in-plane with the PCB and can enter the embedded waveguide 6. The redirecting optics can include a mirror, a lens, or a light directing element similar to light directing elements 390 or 390' as shown in FIGS. 5A and 5B.

Figure 11:
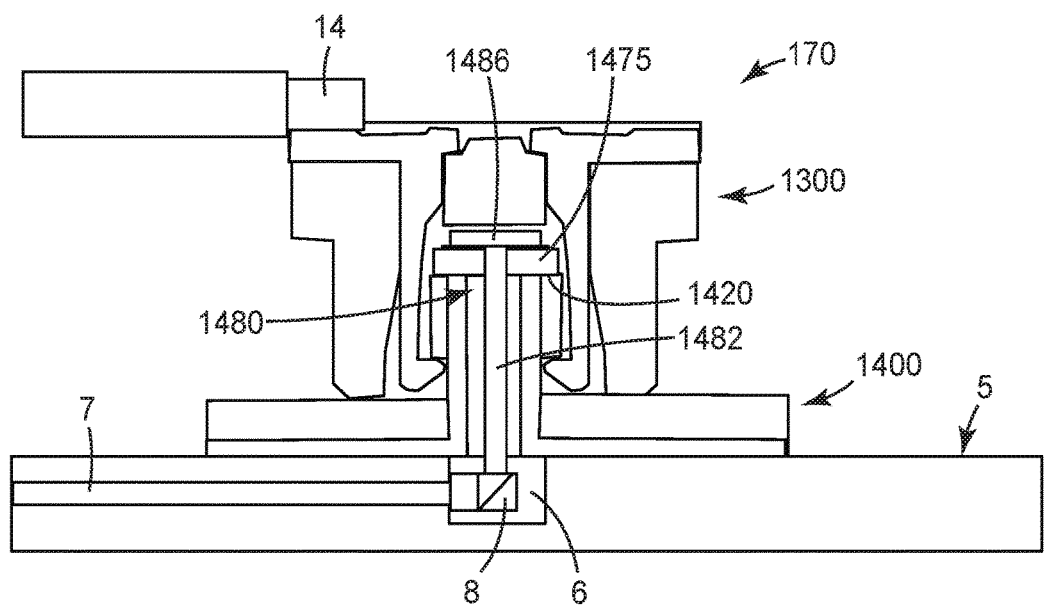
FIG. 11 is a cross-sectional view of a sixth exemplary hybrid high-speed cable-to-board interconnection system according to an aspect of the invention.

FIG. 11 illustrates a sixth exemplary hybrid high-speed cable-to-board interconnection system comprising a cable connector 1300 and a board connector 1400. In this embodiment, the exemplary interconnections system takes electrical signals from an electrical conductor 14 and transforms the electrical signals into optical signals which are then introduced into at least one embedded waveguide 7 disposed within PCB 5. Cable connector 1300 can be analogous to the cable connector described in published US Patent Publication No. 2015-0311612, incorporated herein by reference in its entirety.

Board connector 1400 comprises an optical relay portion 1480 comprising an optoelectronic device 1486 attached to a secondary circuit board 1475 disposed on a top surface of wall 1420 and an optical waveguide to conduct optical signals produced by the optoelectronic device to PCB 5. The optoelectronic device transforms the electrical signals transmitted from cable connector 1300 and transforms them into optical signals which are injected into waveguide 1482. Waveguide 1482 brings the optical signals proximate to the redirection optics 8 disposed in the bottom of the well 6 formed in the top surface of PCB5. The redirecting optics alters the direction of the transmitted light entering the well so that the light will be in-plane with the PCB and can enter the embedded waveguide 6.

Embodiments discussed in this disclosure include:

In a first embodiment, a connector comprises an electrically insulating housing having a base extending along orthogonal length (x) and width (y) directions of the connector and comprises opposing first and second major surfaces and a wall extending from the first major surface of the base along the length direction and along a height direction (z) of the connector perpendicular to the length and width directions. The wall comprises opposing first and second side surfaces extending along the length direction between opposing first and second end surfaces extending along the width direction; and a top surface extending between the first and second side surfaces and the first and second end surfaces. Parallel rows of first and second terminals are disposed in the housing. Each first and second terminal has a terminal portion extending along the width direction and disposed at least partially in the base and configured to make contact with an electrically conductive trace of a printed circuit board, and a mating portion extending along the height direction and disposed at least partially in the wall, the mating portions of the first and second terminals adjacent the respective first and second side surfaces of the wall and configured to contact terminals of a mating connector, the wall. The connector further includes an optical relay portion comprising at least one of a lens, an optical waveguide and an optoelectronic device.

A second embodiment is the connector of the first embodiment, wherein the wall has a cavity formed therein between the first and second terminals, the cavity extending to and defining a first cavity opening at the top surface of the wall.

A third embodiment is the connector of the second embodiment, wherein the optical relay portion comprises a secondary circuit board for mounting an optical transceiver disposed in the cavity and comprises a plurality of electrically conductive traces electrically connected to at least some of the first and second terminals.

A fourth embodiment is the connector of the first embodiment, wherein the optical relay portion comprises a secondary circuit board is disposed adjacent to the top surface of the wall for mounting the optoelectronic device, wherein the secondary circuit board comprises a plurality of electrically conductive traces electrically connected to at least some of the first and second terminals.

A fifth embodiment is the connector of either of the third or fourth embodiments, further comprising a thermal slug disposed beneath the secondary circuit board to facilitate removal of excess heat generated by the optoelectronic device.

A sixth embodiment is the connector of the third embodiment, wherein the optical relay portion further comprises a focal lens disposed near the optoelectronic device, wherein the focal lens focuses incoming light on the optoelectronic device.

A seventh embodiment is the connector of the first embodiment, wherein the optical relay portion comprises an optical waveguide extending from the top surface of the wall to the bottom of the connector, wherein the waveguide transmits optical signals through the connector so that they can be coupled into the printed circuit board.

A eighth embodiment is a connector that comprises an electrically insulating housing, parallel rows of first and second terminals disposed in the housing, and an optical relay portion. Each of the first and second terminals comprises a terminal portion configured to make contact with one of an electrically conductive trace of a circuit board and an electrical conductor; and a mating portion configured to contact a terminal of a mating connector, the mating portions of the first terminals parallel to and facing the mating portions of the second terminals. The housing defining a cavity therein between the mating portions of the first and second terminals, the cavity defining a cavity opening at an external surface of the housing for receiving light therefrom. The optical relay portion disposed in the cavity and comprises at least one of an optoelectronic device, an optical lens and an optical waveguide.

A ninth embodiment is the connector of the eighth embodiment, wherein the optical relay portion comprises a fiber connection system disposed adjacent to the external surface of the housing to couple optical signals carried by an optical cable into an optical waveguide that passes from the external surface of the housing into the housing cavity and a lens disposed within the cavity wherein the lens aligns and directs the light so that it can be coupled into a mating connector.

A tenth embodiment is the connector of the eighth embodiment, wherein the optical relay portion comprises a fiber connection system disposed adjacent to the external surface of the housing to couple optical signals carried by an optical cable into an optical waveguide that passes from the external surface of the housing into the housing cavity so that it can be coupled into a mating connector.

An eleventh embodiment is the connector of the eighth embodiment, wherein the optical relay portion further comprises a fiber connection system disposed adjacent to the external surface of the housing to couple optical signals carried by an optical cable with the optical relay system.

A twelfth embodiment is the connector of one of the ninth thru the eleventh embodiments, wherein the fiber connection system comprises at least one waveguide alignment member to align and hold the waveguides of the optical cable and a light redirecting element that directs the optical signals into the connector.

An eleventh embodiment is the connector of the twelfth embodiment, wherein the light redirecting element comprises one of a reflective surface, a reflective lens, and a prism.

In a fourteenth embodiment, a connector comprises an electrically insulating housing, parallel rows of first and second terminals disposed in the housing, and an optical relay portion. Each of the first and second terminals comprises a terminal portion configured to make contact with an electrically conductive trace of a circuit board and a mating portion configured to contact a terminal of a mating connector, the mating portions of the first terminals parallel to and facing the mating portions of the second terminals. The housing defines a cavity therein between the mating portions of the first and second terminals. The cavity defines a cavity opening at an external surface of the housing for receiving light therefrom. The optical relay portion is disposed in the cavity and comprises at least one of an optoelectronic device, an optical lens and an optical waveguide.

A fifteenth embodiment is the connector of the fourteenth embodiment, wherein the housing comprises a wall extending from the first major surface of a base along the length direction and along a height direction (z) of the connector perpendicular to the length and width directions, the wall comprising: opposing first and second side surfaces extending along the length direction between opposing first and second end surfaces extending along the width direction; and a top surface extending between the first and second side surfaces and the first and second end surfaces.

A sixteenth embodiment is the connector of the fifteenth embodiment, wherein the cavity is formed in the top surface of the wall between the first and second terminals, the cavity extending to and defining a first cavity opening at the top surface of the wall.

A seventeenth embodiment is the connector of either the fourteenth embodiment or the sixteenth embodiment, wherein the optical relay portion comprises a secondary circuit board is disposed in the cavity, the secondary circuit board comprises a plurality of electrically conductive traces electrically connected to at least some of the first and second terminals, and an optoelectronic device mounted on the secondary circuit board.

A eighteenth embodiment is the connector of the fourteenth embodiment, wherein the optical relay portion comprises a secondary circuit board disposed adjacent to the top surface of the wall, the secondary circuit board comprises a plurality of electrically conductive traces electrically connected to at least some of the first and second terminals, and an optoelectronic device mounted on the secondary circuit board.

A nineteenth embodiment is the connector of any of the fourteenth thru the eighteenth embodiments, that further comprises one of a thermal slug and a heat spreader disposed adjacent to the secondary circuit board to facilitate removal of excess heat generated by the optoelectronic device.

A twentieth embodiment is the connector of any of the fourteenth thru the nineteenth embodiments, wherein the optical relay portion further comprises a focal lens disposed near the optoelectronic device, wherein the focal lens focuses incoming light on the optoelectronic device.

A twenty-first embodiment is the connector of any of the fourteenth thru the twentieth embodiments, wherein the optical relay portion comprises a fiber connection system disposed adjacent to the external surface of the housing to couple optical signals carried by an optical cable into an optical waveguide that passes from the external surface of the housing into the housing cavity so that it can be coupled into a mating connector.

A twenty-second embodiment is the connector of any of the fourteenth thru the twentieth embodiments, wherein the optical relay portion further comprises a fiber connection system disposed adjacent to the external surface of the housing to couple optical signals carried by an optical cable with the optical relay portion.

A twenty-third embodiment is the connector of either the twenty-first or twenty-second embodiments, wherein the fiber connection system comprises at least one waveguide alignment member to align and hold the waveguides of the optical cable or a light redirecting element that directs the optical signals into the connector.

A twenty-fourth embodiment is the connector of twenty third embodiment, wherein the light redirecting element comprises one of a reflective surface, a reflective lens, and a prism.

In a twenty-fifth embodiment, a hybrid cable-to-board interconnection system comprises a board connector and a cable connector, wherein at least one of the board connector and cable connector includes an optical relay portion to transmit signals carried by an optical cable to the printed circuit board. The board connector comprises a base that holds parallel rows of first electrical terminals and second electrical terminals, wherein each of the first and second electrical terminals has a terminal portion disposed at least partially in the base and wherein the terminal portion is configured to make contact with an electrically conductive trace of a printed circuit board and a mating portion extending generally perpendicular from the terminal portion along a height direction of the base, and the cable connector comprises a housing that holds parallel rows of first electrical terminals and second electrical terminals, wherein each of the first and second electrical terminals has a terminal portion disposed at least partially in the base and wherein the terminal portion is configured to make contact with one of an electrically conductive trace of a second circuit board or an electrical conductor and a mating portion extending generally perpendicular from the terminal portion along a height direction of the housing. The first and second terminals of the board connector are configured to electrically contact the corresponding first and second terminals of the cable connector. The optical relay portion is disposed at least partially in a cavity within one of the board connector and cable connector and comprises at least one of an optoelectronic device, a lens and an optical waveguide.

A twenty-sixth embodiment is the cable-to-board interconnection system of the twenty-fifth embodiment that further comprises a fiber connection system disposed adjacent to the external surface of the housing of the cable connector to couple optical signals carried by an optical cable with the optical relay portion.

A twenty-seventh embodiment is the cable-to-board interconnection system of twenty-sixth embodiment, wherein the fiber connection system comprises at least one waveguide alignment member to align and hold the waveguides of the optical cable and a light redirecting element that directs the optical signals into the connector system.

A twenty-eighth embodiment is the cable-to-board interconnection system of the twenty-seventh embodiment, wherein the light redirecting element comprises one of a reflective surface, a reflective lens, and a prism.

A twenty-ninth embodiment is the connector in any of the previous embodiments, wherein the lens is one of a converging lens or a collimating lens.

A thirtieth embodiment is the connector of any of the previous embodiments, wherein the optoelectronic device is a transceiver.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the mechanical, electro-mechanical, and electrical arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A connector comprising:
    an electrically insulating housing comprising:
    a base extending along orthogonal length (x) and width (y) directions of the connector and comprising opposing first and second major surfaces;
    a wall extending from the first major surface of the base along the length direction and along a height direction (z) of the connector perpendicular to the length and width directions, the wall comprising:
        opposing first and second side surfaces extending along the length direction between opposing first and second end surfaces extending along the width direction; and
        a top surface extending between the first and second side surfaces and the first and second end surfaces;
    parallel rows of first and second terminals disposed in the housing, each first and second terminal comprising:
        a terminal portion extending along the width direction and disposed at least partially in the base and configured to make contact with an electrically conductive trace of a printed circuit board; and
        a mating portion extending along the height direction and disposed at least partially in the wall, the mating portions of the first and second terminals adjacent the respective first and second side surfaces of the wall and configured to contact terminals of a mating connector, the wall defining a cavity therein between the first and second terminals; and
    an optical relay portion comprising at least one of a lens, an optical waveguide and an optoelectronic device disposed in the cavity.

2. The connector of claim 1, wherein the cavity extends to and defines a first cavity opening at the top surface of the wall, and wherein the optical relay portion comprises a secondary circuit board for mounting an optical transceiver disposed in the cavity, the secondary circuit board comprising a plurality of electrically conductive traces electrically connected to at least some of the first and second terminals.

3. The connector of claim 1, wherein the optical relay portion comprises a secondary circuit board disposed adjacent to the top surface of the wall for mounting the optoelectronic device, and wherein the secondary circuit board comprises a plurality of electrically conductive traces electrically connected to at least some of the first and second terminals.

4. A connector comprising:
    an electrically insulating housing comprising:
    a base extending along orthogonal length (x) and width (y) directions of the connector and comprising opposing first and second major surfaces,
    a wall extending from the first major surface of the base along the length direction and along a height direction (z) of the connector perpendicular to the length and width directions, the wall comprising:
        opposing first and second side surfaces extending along the length direction between opposing first and second end surfaces extending along the width direction; and
        a top surface extending between the first and second side surfaces and the first and second end surfaces;
    parallel row of first and second terminals disposed in the housing, each first and second terminal comprising,
        a terminal portion extending along the width direction and disposed at least partially in the base and configured to make contact with an electrically conductive trace of a printed circuit board, and
        a mating portion extending along the height direction and disposed at least partially in the wall, the mating portions of the first and second terminals adjacent the respective first and second side surfaces of the wall and configured to contact terminals of a mating connector, the wall; and
    an optical relay portion comprising an optical waveguide the optical waveguide extending from the top surface of the wall to the bottom of the connector, wherein the waveguide transmits optical signals through the connector so that they can be coupled into the printed circuit board.

5. A connector comprising:
an electrically insulating housing;
parallel rows of first and second terminals disposed in the housing, each first and second terminal comprising:
a terminal portion configured to make contact with one of an electrically conductive trace of a circuit board and an electrical conductor; and
a mating portion configured to contact a terminal of a mating connector, the mating portions of the first terminals parallel to and facing the mating portions of the second terminals,
the housing defining a cavity therein between the mating portions of the first and second terminals, the cavity defining a cavity opening at an external surface of the housing for receiving light therefrom; and
an optical relay portion disposed in the cavity and comprising at least one of an optoelectronic device, an optical lens and an optical waveguide.

6. The connector of claim 5, wherein the optical relay portion comprises a fiber connection system disposed adjacent to the external surface of the housing to couple optical signals carried by an optical cable into an optical waveguide that passes from the external surface of the housing into the housing cavity and a lens disposed within the cavity wherein the lens aligns and directs the light so that it can be coupled into a mating connector.

7. The connector of claim 5, wherein the optical relay portion comprises a fiber connection system disposed adjacent to the external surface of the housing to couple optical signals carried by an optical cable into an optical waveguide that passes from the external surface of the housing into the housing cavity so that it can be coupled into a mating connector.

8. The connector of claim 5, wherein the optical relay portion further comprises a fiber connection system disposed adjacent to the external surface of the housing to couple optical signals carried by an optical cable with the optical relay system.

9. The connector of claim 8, wherein the fiber connection system comprises at least one waveguide alignment member to align and hold the waveguides of the optical cable and a light redirecting element that directs the optical signals into the connector.

10. A connector comprising:
an electrically insulating housing;
parallel rows of first and second terminals disposed in the housing, each first and second terminal comprising:
a terminal portion configured to make contact with an electrically conductive trace of a circuit board; and
a mating portion configured to contact a terminal of a mating connector, the mating portions of the first terminals parallel to and facing the mating portions of the second terminals,
the housing defining a cavity therein between the mating portions of the first and second terminals, the cavity defining a cavity opening at an external surface of the housing for receiving light therefrom; and
an optical relay portion disposed in the cavity and comprising at least one of an optoelectronic device, an optical lens and an optical waveguide.

11. The connector of claim 10, wherein the housing comprises a wall extending from the first major surface of a base along the length direction and along a height direction (z) of the connector perpendicular to the length and width directions, the wall comprising: opposing first and second side surfaces extending along the length direction between opposing first and second end surfaces extending along the width direction, and a top surface extending between the first and second side surfaces and the first and second end surfaces.

12. The connector of claim 11, wherein the cavity is formed in the top surface of the wall between the first and second terminals, the cavity extending to and defining a first cavity opening at the top surface of the wall.

13. The connector of either of claim 10, wherein the optical relay portion comprises a secondary circuit board is disposed in the cavity, the secondary circuit board comprises a plurality of electrically conductive traces electrically connected to at least some of the first and second terminals, and an optoelectronic device mounted on the secondary circuit board.

14. The connector of claim 10, wherein the optical relay portion comprises a secondary circuit board disposed adjacent to the top surface of the wall, and wherein the secondary circuit board comprises a plurality of electrically conductive traces electrically connected to at least some of the first and second terminals, and an optoelectronic device mounted on the secondary circuit board.

15. The connector of claim 10, wherein the optical relay portion further comprises a focal lens disposed near the optoelectronic device, wherein the focal lens focuses incoming light on the optoelectronic device.

16. The connector of claim 10, wherein the optical relay portion comprises a fiber connection system disposed adjacent to the external surface of the housing to couple optical signals carried by an optical cable into an optical waveguide that passes from the external surface of the housing into the housing cavity so that it can be coupled into a mating connector.

17. The connector of claim 10, wherein the optical relay portion further comprises a fiber connection system disposed adjacent to the external surface of the housing to couple optical signals carried by an optical cable with the optical relay portion.

18. The connector of claim 17, wherein the fiber connection system comprises at least one waveguide alignment member to align and hold the waveguides of the optical cable and a light redirecting element that directs the optical signals into the connector.

19. The connector of claim 18, wherein the light redirecting element comprises one of a reflective surface, a reflective lens, and a prism.

* * * * *

UNITED STATES PATENT AND TRADEMARK OFFICE
CERTIFICATE OF CORRECTION

PATENT NO. : 10,386,589 B2  
APPLICATION NO. : 15/881827  
DATED : August 20, 2019  
INVENTOR(S) : Terry Smith et al.

Page 1 of 1

It is certified that error appears in the above-identified patent and that said Letters Patent is hereby corrected as shown below:

On the Title Page

Column 1 (Assignee)
Line 1, delete "Innovation" and insert -- Innovative --, therefor.

In the Specification

Column 3
Line 56, delete "the a" and insert -- a --, therefor.

Column 11
Line 42, delete "an a" and insert -- a --, therefor.

In the Claims

Column 20
Line 42, in Claim 4, delete "surfaces," and insert -- surfaces; --, therefor.
Line 53, in Claim 4, delete "row" and insert -- rows --, therefor.
Line 58, in Claim 4, delete "board," and insert -- board; --, therefor.
Line 65, in Claim 4, delete "waveguide" and insert -- waveguide, --, therefor.

Signed and Sealed this
Fourteenth Day of January, 2020

Andrei Iancu
*Director of the United States Patent and Trademark Office*